(12) United States Patent
Rutherford

(10) Patent No.: US 9,116,421 B1
(45) Date of Patent: Aug. 25, 2015

(54) PROJECTOR WITH LASER ILLUMINATION ELEMENTS OFFSET ALONG AN OFFSET AXIS

(71) Applicant: Todd S. Rutherford, Wyoming, OH (US)

(72) Inventor: Todd S. Rutherford, Wyoming, OH (US)

(73) Assignee: Greenlight Optics, LLC, Loveland, OH (US)

( * ) Notice: Subject to any disclaimer, the term of this patent is extended or adjusted under 35 U.S.C. 154(b) by 174 days.

(21) Appl. No.: 13/735,663

(22) Filed: Jan. 7, 2013

Related U.S. Application Data

(60) Provisional application No. 61/584,222, filed on Jan. 7, 2012.

(51) Int. Cl.
*G03B 21/14* (2006.01)
*G03B 21/20* (2006.01)
*H04N 9/31* (2006.01)

(52) U.S. Cl.
CPC .......... *G03B 21/2033* (2013.01); *G03B 21/208* (2013.01); *G03B 21/2066* (2013.01); *H04N 9/3152* (2013.01); *H04N 9/3161* (2013.01)

(58) Field of Classification Search
CPC ............... G03B 21/20; G03B 21/2006; G03B 21/2013; G03B 21/2033; G03B 21/2066; G03B 21/208; G03B 21/2093; H04N 9/31; H04N 9/3138; H04N 9/3152; H04N 9/3161; H04N 9/3164
USPC .......... 353/30–31, 33, 37, 50–51, 77–78, 81, 353/94, 98–99; 348/744, 798; 362/230–231, 234–237, 241, 244–245, 362/249.06, 249.14
See application file for complete search history.

(56) References Cited

U.S. PATENT DOCUMENTS

| | | | |
|---|---|---|---|
| 6,594,090 B2 * | 7/2003 | Kruschwitz et al. | 359/707 |
| 7,559,653 B2 * | 7/2009 | Silverstein | 353/7 |
| 8,215,776 B2 * | 7/2012 | Kessler et al. | 353/31 |
| 2005/0128441 A1 * | 6/2005 | Morgan | 353/102 |
| 2011/0001937 A1 * | 1/2011 | Matsumoto | 353/54 |
| 2012/0133900 A1 * | 5/2012 | Miura | 353/31 |
| 2012/0188519 A1 * | 7/2012 | Willett et al. | 353/31 |
| 2013/0126930 A1 * | 5/2013 | Kabuki et al. | 257/98 |
| 2013/0194552 A1 * | 8/2013 | Matsubara et al. | 353/31 |

* cited by examiner

*Primary Examiner* — Jori S Reilly-Diakun
(74) *Attorney, Agent, or Firm* — Jenei, LLC

(57) ABSTRACT

An optical system has projector optics aligned on a projection axis that is orthogonal to an offset axis. A first laser is positioned in a first plane orthogonal to the projection axis. First folding optics are positioned in the first plane to fold a first beam from the first laser to a first portion of the projector optics. A second laser is in a second plane parallel to, and offset along the offset axis from, the first plane. Second folding optics is positioned in the second plane to fold a second beam from the second laser to a second portion of the projector optics to synthesize the first and second beam.

15 Claims, 5 Drawing Sheets

PROJECTOR WITH LASER ILLUMINATION ELEMENTS OFFSET ALONG AN OFFSET AXIS

CROSS REFERENCE TO RELATED APPLICATIONS

This application claims the benefit of U.S. Provisional Patent Application 61/584,222, entitled "Projector with Laser Illumination" to Rutherford, filed Jan. 7, 2012, the entire contents of which are incorporated herein by reference.

BACKGROUND OF THE INVENTION

1. Field of the Invention

The present disclosure relates to projectors with laser light sources. More specifically, the disclosure relates to illumination modules using multiple laser light sources.

2. Description of the Related Art

Projectors can be designed to use several different types of light sources. Larger, higher power projectors typically use arc lamps as the light source. More compact, lower power projectors can use solid state light sources, most commonly light emitting diodes (LEDs) or lasers. Projectors with laser light sources typically use one laser for each color, and the various laser beams are combined using color selective mirrors, known as dichroic mirrors. Dichroic mirrors reflect one range of wavelengths and transmit another range of wavelengths. The number of dichroic mirrors needed to combine some number (N) of different wavelength lasers is thus equal to N−1.

Referring now to the drawings, FIG. 1 shows the layout 10 of a typical optical system used for combining the light output from, for example, three lasers 10, 11, 12, which emit a laser beam 70 of a desired wavelength in either a continuous or pulsed fashion.

In one embodiment, the three lasers 10, 11, 12 emit a laser beam 70 of three different color wavelengths. The lasers are arranged on three sides of a square prism, often called an "x-cube" 20. The x-cube 20 is formed by gluing together multiple prisms, generally right angled. In a typical arrangement, the right angle prisms have appropriate dichroic coatings 21, 22 on the surfaces such that when assembled together they reflect or transmit the different wavelengths of laser light. A typical arrangement uses a short pass dichroic coating 21 on one side and a long pass dichroic coating 22 on the other side. In this configuration, light from the green wavelength laser 11 is transmitted through both coatings 21 and 22, while the light from the red wavelength laser 10 is reflected from dichroic coating 21 and the light from the blue wavelength laser 12 is reflected from dichroic coating 22. The combined light is then collected by optics such as a collimating lens 4 and a multiple lens array 5.

The x-cube 20 has several disadvantages, including a need for complex dichroic coatings, and assembly of the four right angle prisms with high precision. If the right angle prisms are not precisely sharp, then the area at the center ("center seam") of the "x" where the four (4) prisms join will not function properly, causing loss of light. The problem of the center seam is more significant as the size of the x-cube decreases. Also, the dichroic coatings 21, 22 have lower performance if all the lasers have the same polarization, a configuration with the transmitted beam in p-polarization and the reflected beams in s-polarization is preferred for the coatings, but is not acceptable for projectors that use polarization based modulators such as liquid crystal on silicon (LCOS).

FIG. 2 shows the layout of another typical optical system 12 for combining the light output from, for example, three lasers 10, 11, 12 with different colors. Here, three lasers are arranged approximately on a common plane with optional collection lenses 41a, 41b and 41c to reduce the laser beam divergence. A mirror 25 and a first and second dichroic mirror 26, 27 are used to combine the beams. The light from laser 12 is reflected off a mirror 25, toward the first dichroic mirror 26. The light from the laser 12 is transmitted by the first dichroic mirror 26, while the light from the second laser 11 is reflected from the first dichroic mirror 26. At that point, the beams from the first and second lasers are combined. The combined beam of the first and second lasers then reflects from a second dichroic mirror 27, while the light from the third laser 10 is transmitted through the second dichroic mirror 27. At that point the light from all three lasers is combined and proceeds toward the rest of the optics, which can include beam shaping and homogenization optical elements such as a collimator lens 4 and a multiple lens array 5.

Individual dichroic mirrors have the disadvantage of creating unequal path lengths, which may create more complicated optical layouts. A dichroic x-cube eliminates the problem of unequal path lengths, but can be difficult to fabricate in small sizes due to the resulting need for a small seam at the center of the x-cube.

Also, dichroic mirrors do not allow the combination of beams from lasers with the same or similar wavelengths.

SUMMARY OF THE INVENTION

In one aspect, the present disclosure provides for an illumination module for a projector. The illumination module includes at least two laser sources, which are combined by spatial multiplexing.

In one embodiment, a plurality of beams from two or more light sources are directed into substantially parallel beams that are collected by optics such as a plurality of collimating lenses prior to combination into a single beam. In one embodiment, the optics of the present invention is made of two or more coordinating collimators comprising separate lenses.

In one embodiment, the two or more light sources are of similar color or wavelength. In another embodiment, the two or more light sources are of dissimilar color or different wavelengths.

Benefits of the invention include replacement of complex dichroic mirrors with simpler and less expensive broadband mirrors or turning prisms, the option of combining multiple lasers with similar or identical wavelengths and flexibility in placement of the lasers due to the capability of folding the optical path at compound angles.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

In the following detailed description of the preferred embodiments, reference is made to the accompanying drawings, which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to".

Figure 1:
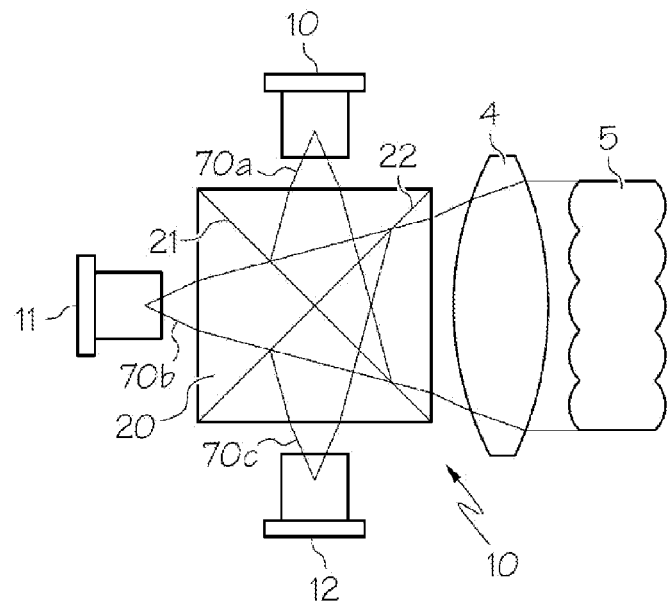
FIG. 1 is a schematic cross-sectional view of a conventional laser beam combiner.
Figure 2:
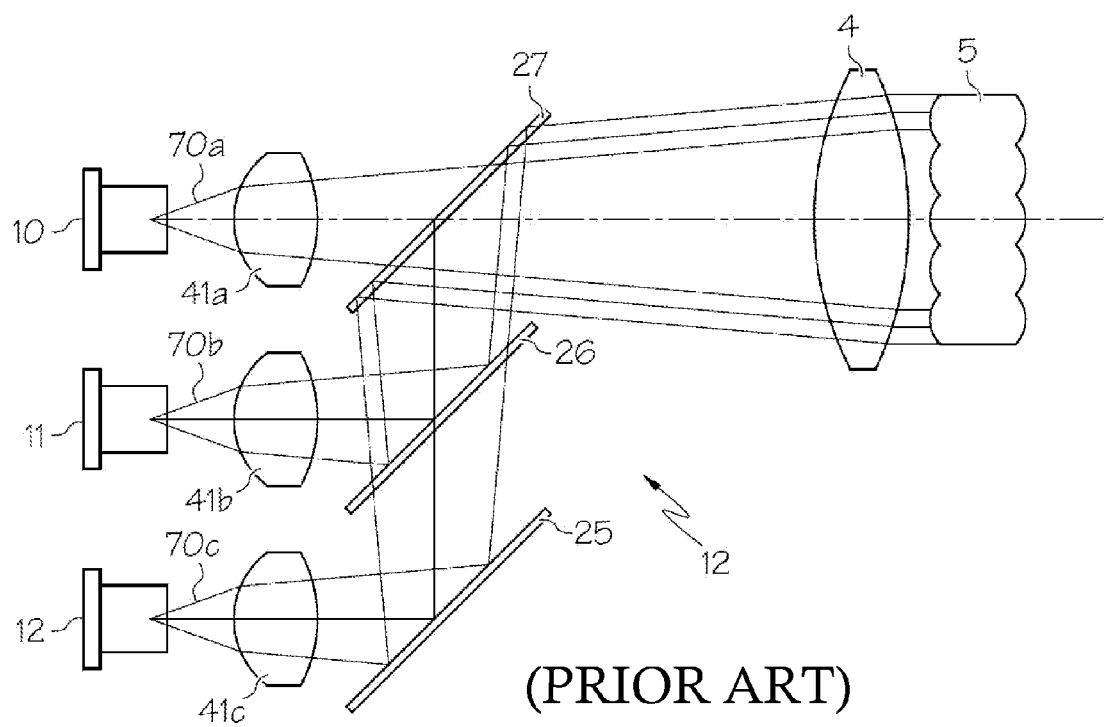
FIG. 2 is a schematic cross-sectional view of another conventional laser beam combiner.
Figure 3:
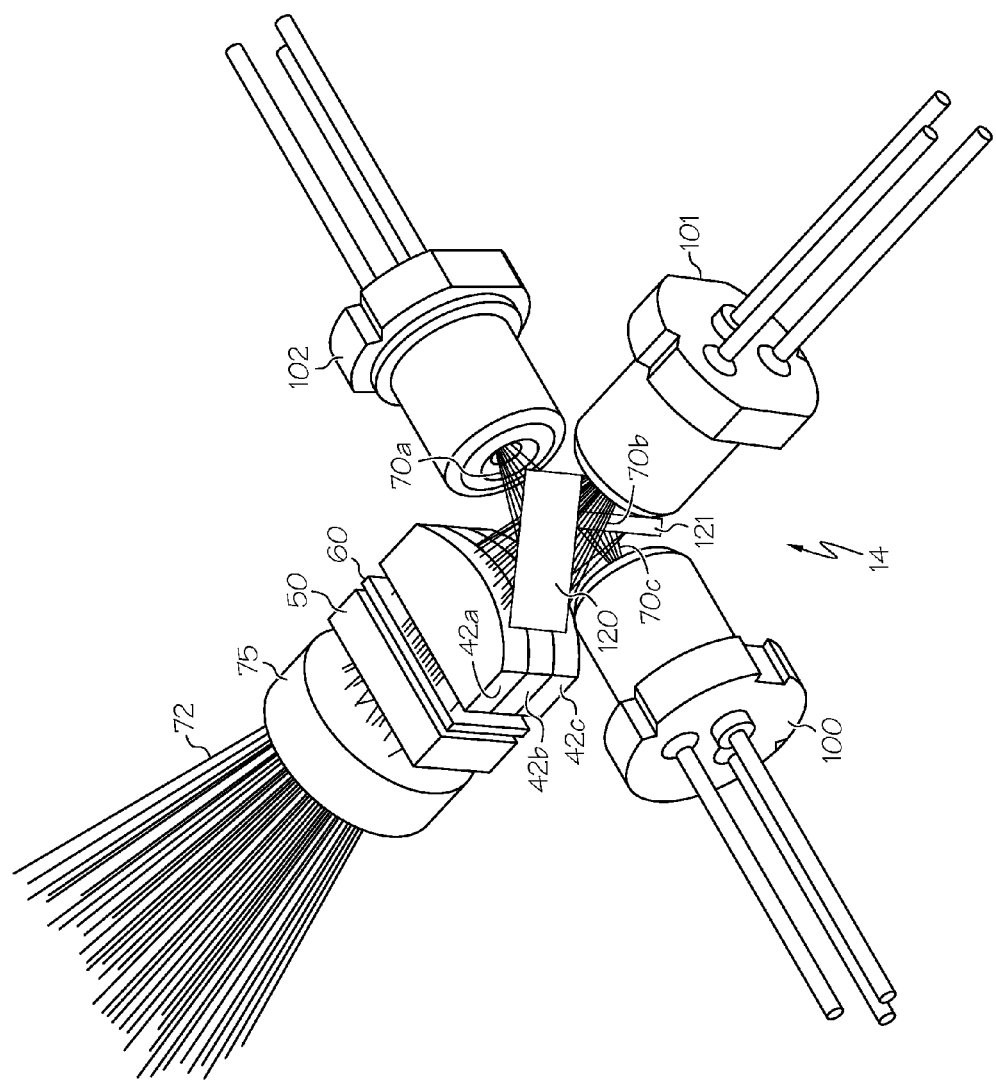
FIG. 3 is a schematic perspective view of an optical system constructed according to an exemplary embodiment of the present disclosure.

Referring now to the drawings, FIG. 1 shows the layout 10 of a typical optical system used for combining the light output from, for example, three lasers 10, 11, 12, which emit a laser beam 70 of a desired wavelength in either a continuous or pulsed fashion.

In one embodiment, the three lasers 10, 11, 12 emit a laser beam 70 of three different color wavelengths. The lasers are arranged on three sides of a square prism, often called an "x-cube" 20. The x-cube 20 is formed by gluing together multiple prisms, generally right angled. In a typical arrangement, the right angle prisms have appropriate dichroic coatings 21, 22 on the surfaces such that when assembled together they reflect or transmit the different wavelengths of laser light. A typical arrangement uses a short pass dichroic coating 21 on one side and a long pass dichroic coating 22 on the other side. In this configuration, light from the green wavelength laser 11 is transmitted through both coatings 21 and 22, while the light from the red wavelength laser 10 is reflected from dichroic coating 21 and the light from the blue wavelength laser 12 is reflected from dichroic coating 22. The combined light is then collected by optics such as a collimating lens 4 and a multiple lens array 5.

As shown in one embodiment, the optical system 14 comprises multiple, independent laser light sources 100, 101, and 102, arranged at right angles. The laser light sources are offset from each other in along an axis for projection. In this particular embodiment, at least one first laser light source 101 is located in-line with the optical axis of the subsequent optical system. At least one second laser light source 102 is located offset from the first along the optical axis and at least one third laser light source 100 is offset from both the first and second along the optical axis.

In one embodiment of the present invention, the optical axes of the optical beams of the light sources are made parallel by use of optical combining devices. The optical combining devices 120 and 121 are mirrors, which convert light emitted from the light emitting sources into parallel light beams. The projector may be configured such that optical beams of one, two, three or more colors or wavelengths are made parallel along the optical axis. In one embodiment, instead of two mirrors, two prisms may be used. Furthermore, green, red, and blue laser light sources may be arranged differently than as shown.

In one embodiment, the first light beam 70a is incident on the first reflective element (mirror) 120 in a first incident direction, the second light beam 70b is incident in a second incident direction, the third light beam 70c is incident on the second reflective element (mirror) 121 in a third incident direction, and the first, the second and the third incident directions are substantially parallel with each other. Once substantially parallel, beams 70a, 70b, and 70c are then directed to a beam collimator 42 that collimates the laser beams emitted from the laser light sources.

In one particular embodiment, the beam collimator 42 is segmented and comprises three parallel collimating lenses 42a, 42b and 42c such that the center axis of each beam is directed to the center of curvature for each collimator lens, which may be a single molded piece comprising a plurality of lens curvatures on the face of beam collimator 42 or a plurality of individual pieces each having a collimator lens curvature. In this embodiment, the light from laser light source 100 reflects from mirror 121 and intersects the center of collimator 42c. The light from laser light source 102 reflects from mirror 120 and intersects the center of collimator 42a. The light from laser light source 101 passes between mirrors 120 and 121 and intersects the center of collimator 42b. The collimator lens 42 can be a singlet or a compound lens, and transforms the diverging beam 70 into a collimated beam.

After the collimators, the light proceeds toward the rest of the optics, which can include beam shaping and homogenization optical elements such as a diffuser 60, a multiple lens array 50 and a relay lens 75. In one embodiment, a diffuser 60, is disposed between the laser light source and the beam-shaping optics 50, and modifies the brightness or etendue of the laser light to reduce speckle and to match the imaging requirements of the projection system. In one embodiment, the light source beams do not overlap until they are downstream of beam shaping and homogenization optical elements. In another embodiment, the optic system further comprises a condenser lens (not shown) disposed between the relay lens and the light sources that emit the excitation light beams. The optics used herein may be an optical grade substrate such as glass, quartz, acrylic, sapphire or transparent synthetic resin.

The system can be further simplified by integration of the collimation lens function into the lens array. In this case each lens on the entrance side of the lens array would have a curve that is defined by the original lens array plus a portion of the collimation curve. In this way the function of the collimating lens is combined with that of the lens array.

Although certain optics are shown schematically downstream from laser collimator 42, it should be recognized that various optics may be positioned throughout the system 14. Optics may include mirrors, lenses, filters, prisms, dichroic plates, or virtually any other device that at least partially focuses, redirects, absorbs, or otherwise works on light from the illumination source.

In another embodiment of the invention, prisms can be used in place of the fold mirrors, with the advantage that the reflection can be attained by total internal reflection without any need for a reflective coating. In this case, an anti-reflection coating can be used on the other surfaces of the prism to increase throughput. In yet another embodiment, a monolithic fold prism block that is pre-aligned can replace the individual fold prisms.

It is also assumed that one collimator lens is used for each light source. The projector may also be configured with the collimator lenses combined into a single optical element as an array of lenses. In addition, it is assumed that the laser light sources emitting the green, red, and blue optical beams, respectively, are in separate packages. In another embodiment, the light sources may be mounted in a single package. In another embodiment, the laser light sources comprise green, red, and blue optical beams and further comprise a white light source. In another embodiment, the single-color light sources include laser, light emitting diode (LED), or organic electro-luminescence elements.

The present embodiment is so configured that after the optical beams of the three colors are converted into parallel rays of light using the three collimator lenses, optical beams of three colors are synthesized by using two optical combining devices. However, the beams may be converted into parallel beams of light by a single collimator lens. Also, in this case, a beam steering prism may be located immediately behind the collimator lens, and the laser light sources may be so adjusted that the optical beams of the three colors passed through the prism are made coincident in angle.

As used herein, a "laser" or "laser light source" means one or more light emitting lasers. In one embodiment, the optical system 14 of the present invention comprises at least three independent light sources wherein in a first laser light source emits green light, for example, in the 532+/−10 nm band; a second laser light source emits red, for example, in the 640+/−10 nm band; and a third laser light source emits a blue light beam, for example, in the 440+/−10 nm band.

In another embodiment, the optical system 14 of the present invention wherein a first laser light source emits green light and has a radiant flux range of from about 40 to about 1000 mW; a second laser light source emits red light and has a radiant flux range of from about 40 to about 1000 mW; and a third laser light source emits blue light and has a radiant flux range of from about 40 to about 1000 mW.

Figure 4:
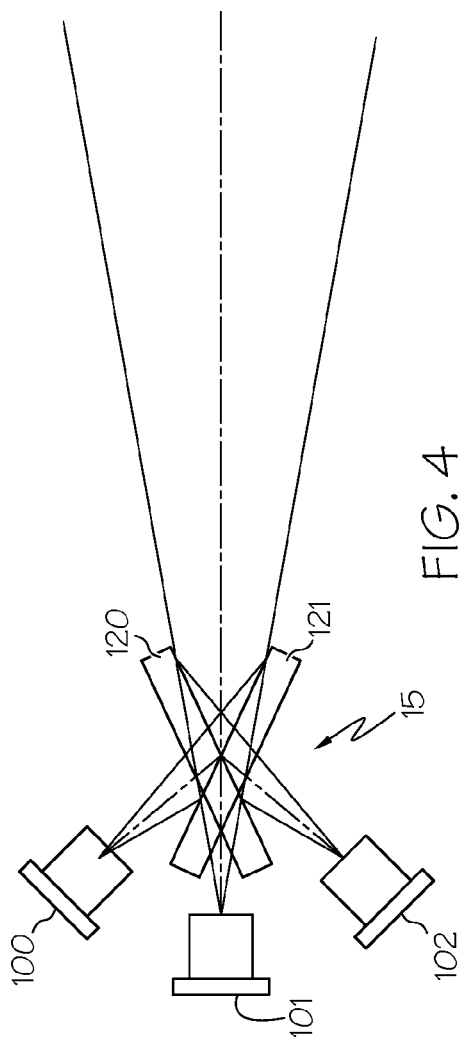
FIG. 4 is a schematic cross-sectional view of an optical system constructed according to another exemplary embodiment of the present disclosure.

One advantage of the invention is that the arrangement of lasers is flexible. As an example of different laser arrangement, FIG. 4 shows an optical system 15 where the three lasers 100, 101, 102 are arranged at angles other than ninety (90) degrees from each other. In the embodiment shown in FIG. 4, the lasers 100 and 102 reflect from mirrors 121 and 120 respectively at an angle greater than ninety (90) degrees, but angles less than or greater than ninety (90) degrees are possible. Reflections at compound angles are also possible, which allows the laser packages to be located out of the plane of the illumination and projection optical axes.

In the embodiments and the modifications described above, three kinds of light sources that emit lights having different wavelengths are used, although it is not limited thereto. Alternatively, two or four or more types of light sources, for example, may be used instead of three light sources. Also, in the embodiments and the modifications described above, the plural kinds of light sources (for red, for green, and for blue, although the types of colors and the number of the colors are not limited thereto) are each configured by the laser light source, although it is not limited thereto. It is sufficient for the light source section to have the configuration in which one or more of the plural kinds of light sources is (are) configured by the laser light source. In one embodiment, a combination of the laser light source and another light source (such as LEDs, although it is not limited thereto) may be provided in the light source section.

Figure 5:
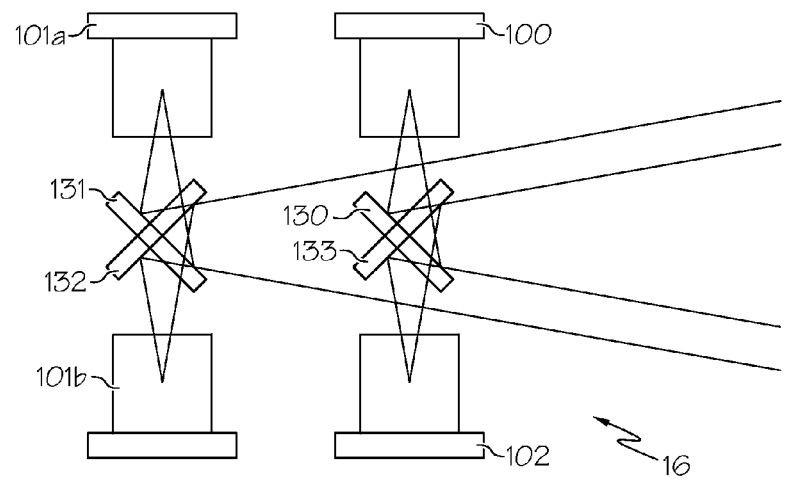
FIG. 5 is a schematic cross-sectional view of an optical system constructed according to another exemplary embodiment of the present disclosure.

A further advantage of the invention is that more than three light sources can be used. FIG. 5 shows an optical system 16 that is an embodiment of the present invention using a four light source system, but higher numbers are also possible. In the embodiment shown in FIG. 5, lasers 100, 101a, 101b, and 102 reflect from mirrors 130, 131, 132 and 133 respectively. An additional advantage of this invention is that more than one laser can have the same wavelength, or nearly the same wavelength. For example, optical system 16 could contain one red laser 100, one blue laser 102 and two green lasers 101a, 101b. The addition of a second green laser might be advantageous because some green lasers are limited to lower powers.

Figure 6:
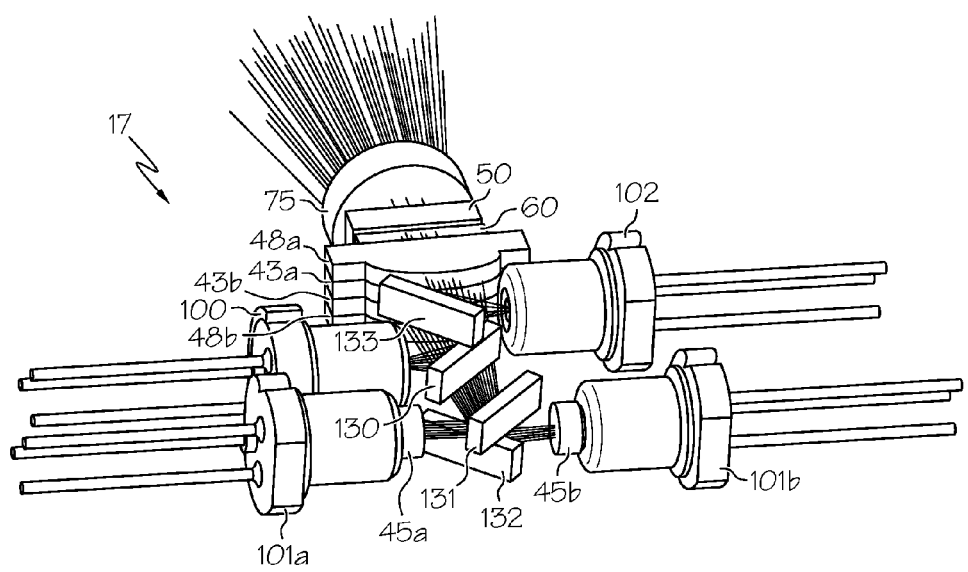
FIG. 6 is a schematic perspective view of an optical system constructed according to another exemplary embodiment of the present disclosure.

FIG. 6 shows an optical system 17 with four lasers 100, 101a, 101b, 102 where secondary optics 45a and 45b are used in front of some of the lasers 101a, 101b. The secondary optics reduce the beam divergence of the lasers that are placed farther from the collimation lenses 48a, 43a, 43b, 48b. The light from lasers 101a and 101b reflects from mirrors 131 and 132 respectively after passing through the secondary optics 45a and 45b. After the collimators, the light proceeds toward the rest of the optics, which can include beam shaping and homogenization optical elements such as a diffuser 60, a multiple lens array 50 and a relay lens 75. Because the beams are not collinear at the collimating lens, the collimating lens should have multiple curves, one for each beam. These curves could be made by using individual, separate collimating lenses as depicted in FIG. 6, or by integrating all the curves onto a single optic, for instance as a molded plastic optic.

Figure 7:
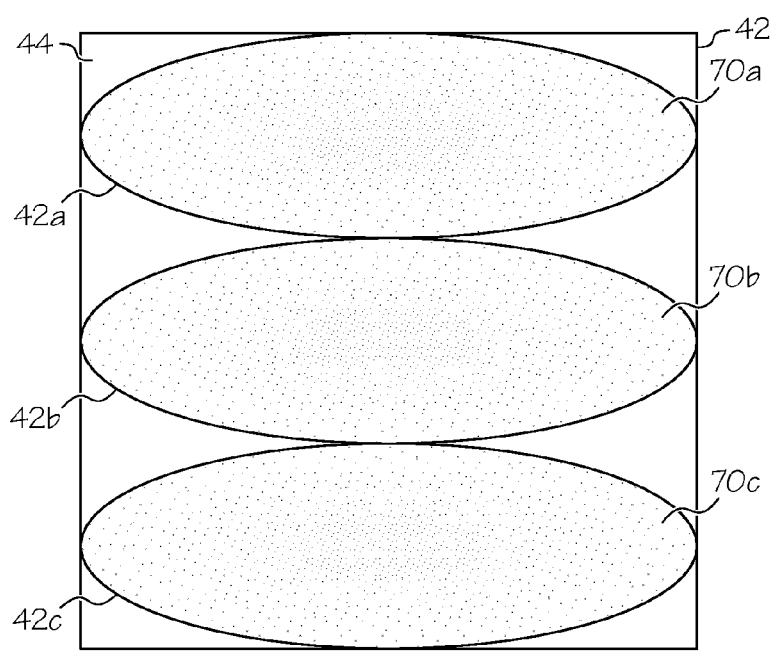
FIG. 7 represents the irradiance of the optical system shown in FIG. 3.

After the folding optics, the combined laser beams 72 are oriented as represented in FIG. 7, where the beams are arranged so that they are parallel and incident on the front collimator face 44 of collimator 42 displaced from each other in the direction of the slow axis of beam divergence. In one embodiment, beam 70a from laser 102 hits mirror 120 and incident on lens 42a oriented on top as shown in FIG. 7. Beam 70b from laser 101 passes between mirrors 120 and 121 and then incident on lens 42b oriented in the middle as shown in FIG. 7. Beam 70c from laser 100 hits mirror 121 and then is incident on lens 42c oriented on the bottom as shown in FIG. 7. In embodiments having four light source beams, collimator 42 may have four lenses.

The optical system 14 can be part of a light projector. In one embodiment, the projector comprises a plurality of light sources emitting non-collimated light beams and a plurality of collimators for collimating the non-collimated light emitted by the light sources. In one embodiment, the projector is a projector system for projecting an image on a projection screen, the projector system comprising a plurality of light sources emitting non-collimated light beams and a plurality of collimators for collimating the non-collimated light emitted by the light sources thus providing tightly collimated light, at least one controller or imager modulating the collimated light according to the information required for image formation, and a projection lens, projecting the divergent light on the projection screen. In another embodiment, the projector system further comprises a plurality of light redirectors. In one embodiment, each light redirector is any one of the group consisting of a total internal reflection prism, a polarization beam splitter, color mixer, and a plurality of mirrors. In another embodiment, the diffuser is any one of the elements selected from the group consisting of a holographic diffuser, plastic film diffuser, and a ground glass diffuser.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

What is claimed is:

1. An illumination system for spatially multiplexing and synthesizing multiple laser beam sources, comprising:
   illumination optics aligned on a projection axis that is orthogonal to an offset axis;
   a first laser in a first plane orthogonal to the projection axis;
   first folding optics positioned in the first plane to fold a first beam from the first laser to a first portion of the illumination optics comprising a first segment of a stacked collimating lens;
   a second laser in a second plane parallel to, and offset along the offset axis from, the first plane;
   second folding optics positioned in the second plane to fold a second beam from the second laser to a second portion of the illumination optics comprising a second segment of the stacked collimating lens,
   wherein illumination optics synthesizes the first and second beam by spatial multiplexing.

2. The illumination system of claim 1, wherein the first and second folding optics comprise folding mirrors.

3. The illumination system of claim 1, wherein the first and second folding optics comprise prisms.

4. The illumination systems of claim 1, wherein at least one of the first and second laser is positioned in a right angle to the projection axis.

5. The illumination system of claim 1, wherein the projection optics further comprises a diffuser, multiple lens array and relay lens downstream to the stacked collimator lenses.

6. The illumination system of claim 5, further comprises a condenser lens disposed between the relay lens and at least one laser.

7. The illumination system of claim 1, further comprising:
   a third laser in a third plane parallel to, and offset along the offset axis from, the first and second planes;
   third folding optics positioned in the third plane to fold a third beam from the third laser to a third portion of the illumination optics,
   wherein illumination optics synthesizes the first, second and third beams.

8. The illumination system of claim 7, wherein the first, second and third beams comprise red, green and blue laser beams.

9. The illumination system of claim 7, further comprising:
   a fourth laser in a fourth plane parallel to, and offset along the offset axis from, the first, second and third planes;
   fourth folding optics positioned in the fourth plane to fold a fourth beam from the fourth laser to a fourth portion of the illumination optics,
   wherein illumination optics synthesizes the first, second, third and fourth beams.

10. The illumination system of claim 9, wherein secondary optics are disposed in front of one or more of the lasers; wherein the secondary optics reduce the beam divergence of the lasers that are placed farther from the collimating lenses.

11. The illumination system of claim 7, wherein a first laser emits green light and has a radiant flux range of from about 40 to about 1000 mW; a second laser emits red light and has a radiant flux range of from about 40 to about 1000 mW; and a third laser emits blue light and has a radiant flux range of from about 40 to about 1000 mW.

12. A projector comprising: the illumination system set forth in claim 1; a light guiding device; a light source side optical system; a display device; a projection side optical system; and projector control device, wherein a light gathering optical system of the light source apparatus gathers light source light on to an incident plane of the light guiding device.

13. The projector of claim 12, further comprising a plurality of light redirectors.

14. The projector of claim 13, wherein each light redirector is any one of the group consisting of a total internal reflection prism, a polarization beam splitter, color mixer, and a plurality of mirrors.

15. The illumination system of claim 1, wherein the first and second segments of stacked collimating lens each have a center axis that directs a received beam to a center of curvature for each segment of the stacked collimator lens in a displaced, stacked alignment.

\* \* \* \* \*